US008395967B2

(12) United States Patent
Lou et al.

(10) Patent No.: US 8,395,967 B2
(45) Date of Patent: Mar. 12, 2013

(54) VECTOR MIGRATION OF VIRTUAL SOURCE VSP DATA

(75) Inventors: Min Lou, Houston, TX (US); Francis D. Doherty, Sugar Land, TX (US); James C. Jackson, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 411 days.

(21) Appl. No.: 12/475,117

(22) Filed: May 29, 2009

(65) Prior Publication Data

US 2009/0310443 A1 Dec. 17, 2009

Related U.S. Application Data

(60) Provisional application No. 61/060,737, filed on Jun. 11, 2008.

(51) Int. Cl.
*G01V 1/36* (2006.01)
(52) U.S. Cl. ................. 367/51; 367/50; 367/57
(58) Field of Classification Search .......... 367/50, 367/51, 57, 73
See application file for complete search history.

(56) References Cited

U.S. PATENT DOCUMENTS

| 6,018,499 A | 1/2000 | Sethian et al. |
| 6,081,482 A | 6/2000 | Bevc |
| 6,324,478 B1 | 11/2001 | Popovici et al. |
| 6,747,915 B2 | 6/2004 | Calvert |
| 7,167,414 B2 | 1/2007 | Lee et al. |
| 7,508,736 B2 | 3/2009 | Lou et al. |
| 2005/0135189 A1* | 6/2005 | Wang ............... 367/50 |

OTHER PUBLICATIONS

M. Lou et al., "Vector Kirchoff Migration of First Order Downgoing Multiples from VSP Data," SEG/San Antonio 2007 Annual Meeting, pp. 3059-3063.*
X. Zhao et al.; "Salt Flank Imaging Using Offset VSP as an Aid to Cavern Construction," SEG/New Orleans 2006 Annual Meeting, pp. 3497-3500.
J. Yu et al.; "Methods for interferometry imaging and application to VSP salt flank imaging," SEG/San Antonio 2007 Annual Meeting, pp. 3049-3053.
R. Lu et al.; "Redatumming through a Salt Canopy—Another Salt Flank Imaging Strategy," SEG/San Antonio 2007 Annual Meeting, pp. 3054-3058.
B. E. Hornby et al.; "Single-well imaging of a salt flank using walkaway VSP data," SEG/New Orleans 2006 Annual Meeting, pp. 3492-3496.
A. Bakulin et al.; "The virtual source method: Theory and case study," Geophysics, vol. 71, No. 4 (Jul.-Aug. 2006), pp. S1139-S1150.
A. Bakulin et al.; "Virtual Source: new method for imaging and 4D below complex overburden," SEG Int'l. Exposition and 74th Annual Meeting, Denver Colorado, Oct. 10-15, 2004, 4 pages.
A. Mateeva et al.; "Steering Virtual Sources for Salt and Subsalt Imaging," SEG/San Antonio 2007 Annual Meeting, pp. 3044-3048.

* cited by examiner

*Primary Examiner* — Ian Lobo
(74) *Attorney, Agent, or Firm* — Mossman Kumar & Tyler PC

(57) ABSTRACT

A walkaway VSP survey is carried out with receivers located in a borehole under a salt overhang. Redatuming of the multicomponent data to virtual sources in the borehole followed by vector Kirchhoff migration using a simple velocity model provides an accurate image of the salt face.

15 Claims, 9 Drawing Sheets
(7 of 9 Drawing Sheet(s) Filed in Color)

VECTOR MIGRATION OF VIRTUAL SOURCE VSP DATA

CROSS-REFERENCES TO RELATED APPLICATIONS

This application claims priority from U.S. Provisional Patent Application Ser. No. 61/060,737 filed on Jun. 11, 2008.

BACKGROUND OF THE DISCLOSURE

1. Field of the Disclosure

This disclosure relates to a method of geophysical prospecting which improves the accuracy of seismic migration. Specifically, the disclosure uses a redatuming method followed by vector migration of VSP survey data for imaging of reflections below salt layers in the earth and salt boundaries.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflector using a procedure known as migration.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver. Salt layers in the subsurface are particularly problematic. Due to the high compressional wave (P-wave) velocity of salt (4.48 km/s or 14,500 ft/s), there is considerable ray-bending of P-waves at the top and bottom of salt layers due to the large velocity contrast. Typical sedimentary velocities in the Gulf of Mexico may be no more than 3 km/s.

Numerous approaches have been taken to address the problem of sub-salt imaging. These include using low frequencies, use of prestack depth migration, use of converted waves, redatuming to the base salt reflection, and seismic inversion. These have had limited success.

U.S. patent application Ser. No. 11/684,378 of Lou et al., having the same assignee as the present disclosure and the contents of which are incorporated herein by reference, teaches the use of a walkaway Vertical Seismic Profile (WVSP) survey to estimate sub-salt velocities by tomographic inversion of reflection travel-times. In a WVSP survey, measurements are made using a plurality of receivers in a borehole responsive to excitation of one or more seismic sources at a plurality of distances from the wellbore. The estimated velocities may then be used for migration of the walkaway VSP data or of surface seismic data. This method is particularly useful in the drilling of offset wells where an initial well that may or may not be productive has been drilled.

Zhao et al. (2006) disclose the use of an offset VSP to image the flanks of salt structures close to a nearby borehole. The offset VSP has advantages over the conventional refraction salt proximity survey in areas where the surrounding sediment velocity is not available. Such migration methods suffer from two drawbacks. The first is the necessity of determining a complex overburden velocity model. The second is the distortion in the seismic signal that travels through a complex overburden.

Yu et al. (2007) discuss the use of interferometric imaging and application to VSP imaging of salt flanks. The principles of seismic interferometry, also referred to as the virtual source method, is becoming a popular technology in VSP data processing to image complex subsurface structures (e. g. salt flanks) under complicated, and often poorly understood, overburden formation (Bakulin and Calvert 2004 &2006, U.S. Pat. No. 6,747,915 to Calvert, Hornby and Yu 2006, Lu et. al. 2007, Mateeva et. al. 2007, Yu and Hornby 2007). Using virtual source technology, surface sources can be redatumed to the borehole receiver positions, in effect creating a series of virtual common shot gathers for each receiver in the borehole. There are two major advantages in using virtual source technology in VSP data processing. The first is the ability to avoid the determination of a complex overburden velocity model necessary for proper image migration. The second is the removal of distortion in the seismic signal that travels through a complex overburden by positioning a virtual source close to the target zone(s).

The prior art methods using interferometric imaging are limited to single component data and performing a scalar migration of single component data. The present disclosure uses multicomponent data (up to 3-receiver components and up to 3 source components). The limitations of single component data in this context had not been recognized previously. The results are unexpectedly better than would be expected simply from considerations of the sine and cosine relationships between the three components.

SUMMARY OF THE DISCLOSURE

One embodiment is a method of seismic imaging a subsurface formation using multicomponent data recorded in a borehole at a plurality of receiver locations responsive to seismic energy generated at a plurality of near-surface source locations. The multicomponent seismic data are redatumed to simulate virtual source positions in the borehole. A vector Kirchhoff migration of reflections in the redatumed data set provides an image of the subsurface.

Another embodiment is a system for seismic imaging a subsurface formation. The system includes at least one seismic source configured to generate seismic waves into the earth from a plurality of locations. The system also includes at least one multicomponent receiver configured to record data in a borehole at a plurality of receiver locations. The system also includes at least one processor configured to redatum the multicomponent seismic to simulate virtual source positions in the borehole, and perform a vector Kirchhoff migration of reflections in the redatumed data set to provide an image of the subsurface.

Another embodiment is a computer-readable medium product having stored thereon instructions that when read by at least one processor cause the at least one processor to perform a method. The method includes redatuming multicomponent seismic data received by at least one receiver at a plurality of depths in a borehole responsive to activation of a seismic source to virtual source positions in the borehole; and performing a vector Kirchhoff migration of the redatumed data to provide an image of the subsurface.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

The present disclosure is best understood by reference to the attached figures in which like numerals refer to like elements, and in which.

DETAILED DESCRIPTION OF THE DISCLOSURE

Figure 1:
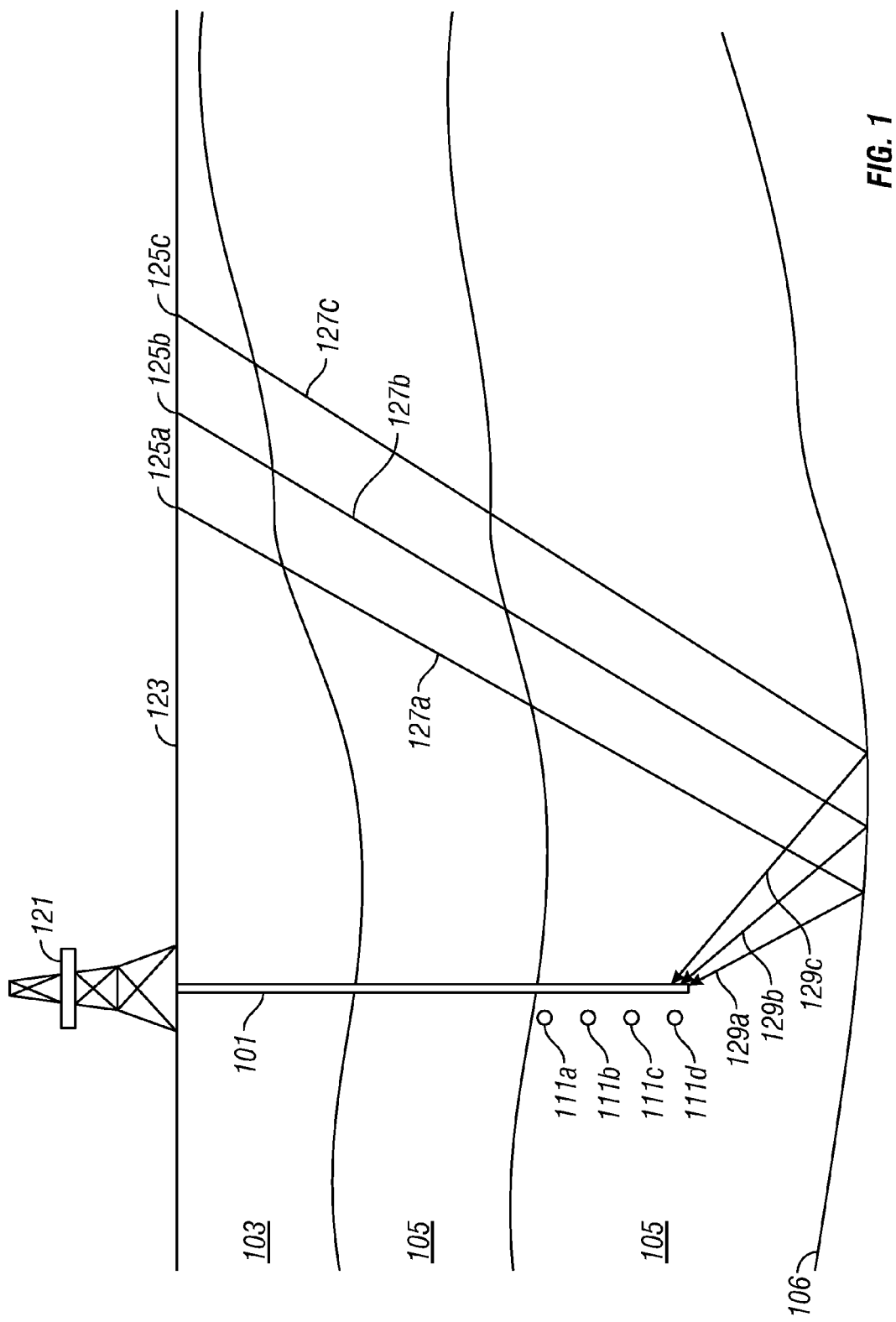
FIG. 1 illustrates the geometry of data acquisition of a walkaway VSP (WVSP) according to the present disclosure.

For the present disclosure, the acquisition geometry of a walkaway VSP is illustrated in FIG. 1. Shown therein is the surface of the earth 123 with a rig 121 thereon. This may be a drilling rig or it may be a mast rig which conveys a wireline into a borehole 101. The borehole 101 penetrates layers 103, 105 .... Positioned in the borehole 101 are seismic sensors denoted by 111a, 111b, 111c, 111d.... Each of the sensors may include a hydrophone, a single-component geophone or a multi-component geophone.

Data for a single offset VSP is typically acquired using a single seismic source such as 125a at the surface (or within a body of water at the surface). For the purposes of this disclosure, a surface of a body of water is considered to be the surface of the earth. An exemplary raypath which depicts the propagation of seismic energy from the source 125a to a detector 111d is depicted by the ray 127a that is reflected from the bottom of layer 105 at the boundary 106 and reaches the receiver 111d along the raypath denoted by 129a.

In a typical VSP, data resulting from operation of a source at a single position such as 125a are recorded in each of the receivers 111a, 111b, 111c, 111d... in the borehole. Analysis of the reflected data can provide information about the seismic velocities in the subsurface and the configuration of the layer boundaries. In a walkaway VSP, this process is repeated for operation of the source at a plurality of source positions such as 125b, 125c.... Acquisition of data from a plurality of source positions at a plurality of detectors provides a redundant sampling of the subsurface region. This makes it possible to determine the velocity of the subsurface based on the travel-times for the rays between each of the sources and each of the receivers. This determination of velocity using travel-times is called "tomographic inversion" and numerous processing packages are commercially available that perform this tomographic inversion of seismic travel-time data.

Figure 2:
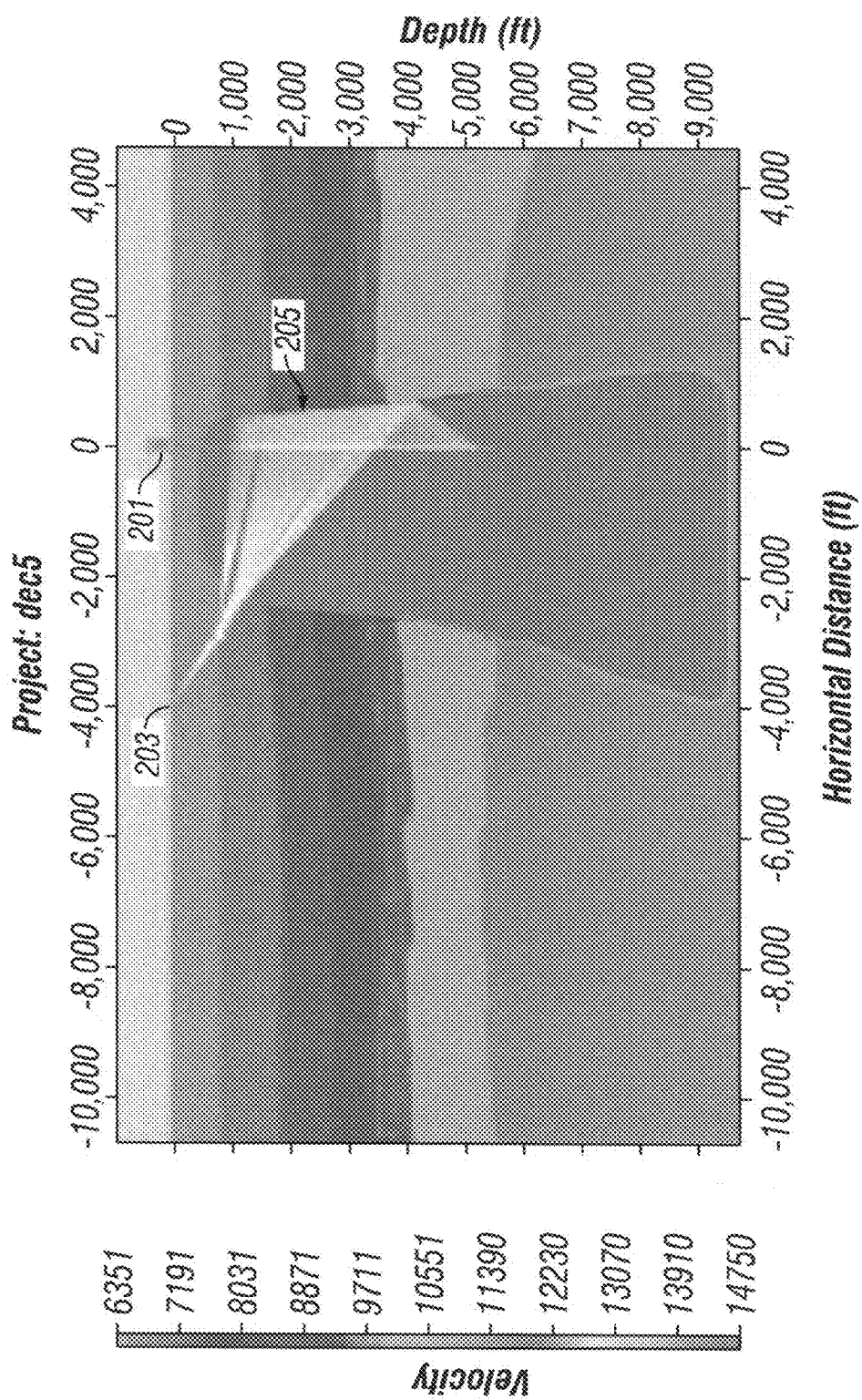
FIG. 2 (prior art) is a display showing offset WVSP raytracing to a well within a salt body.

FIG. 2 shows the ray-tracing picture for one of the modeled source locations 203 at a distance of 4000 ft. from a well 201 that penetrates a salt dome. As can be seen, reflections are produced from the face 205 of the salt body. Finite difference synthetic modeling provides the full elastic wavefield including direct, reflected, and P-S converted waves. The complexity of the ray-diagram is typical of situations in the presence of salt bodies. The complexity arises because the P-wave velocity in salt is approximately 14200 ft/s (4330 m/s) compared to typical values of less than 10000 ft/s (3048 m/s) in the sediments around the salt dome.

Figure 3:
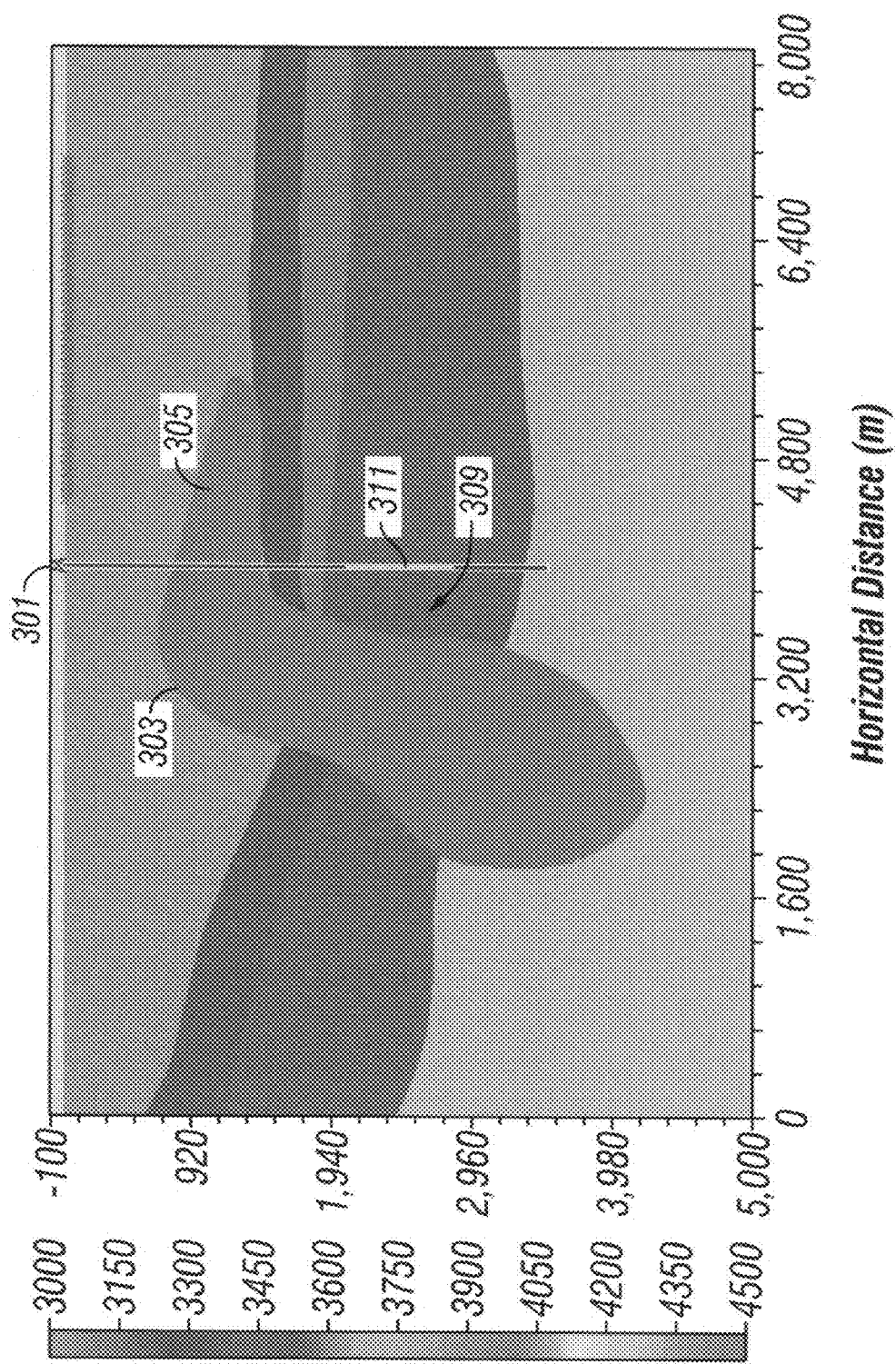
FIG. 3 shows a 2D salt lens and diapir model used for WVSP elastic finite-difference modeling.

Turning now to FIG. 3, a model that was used to illustrate the method of the present disclosure is shown. A well is indicated by 301. The well passes through an overhang portion 305 of a salt body 303. As would be known to those versed in the art, it is quite common for extensive hydrocarbon reserves to accumulate in the sediments adjacent to the face of the salt body 309. A commonly used arrangement is to have seismic receivers deployed in the portion 311 of the well and conduct a WVSP with the objective of imaging the face of the salt body. Due to velocity differences between the salt and the surrounding sediments, prior art migration methods require an accurate and complicated velocity model.

Figure 4:
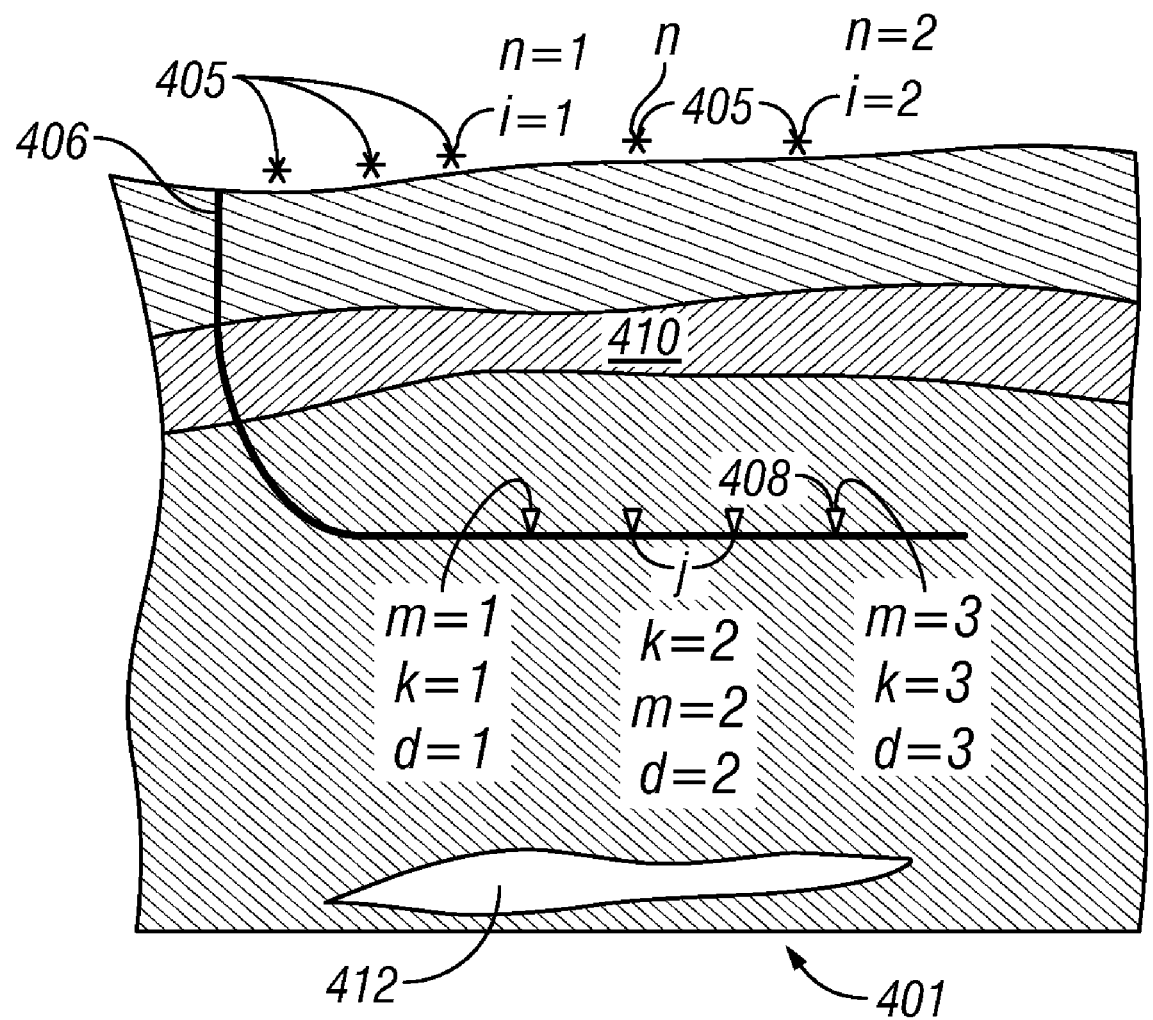
FIG. 4 (prior art) illustrates the principle of redatuming.

FIG. 4 (from U.S. Pat. No. 6,747,915 to Calvert) shows schematically a section 401 of the earth having a surface 402. At the surface 402 are located seismic sources 405, and in a borehole 406 are located seismic receivers 408. The part of the borehole 406 in which the seismic receivers 408 are located lies under a complex transmission medium in the form of complex overburden 410. This could be the salt overhang of 305. Deeper in the section 401 of the earth, below the complex overburden 410, a target area 412 is located of which a seismic image is to be made.

The first step of the method according to the present disclosure is conventional: recording with a set of the seismic receivers 408 the signals obtained from activating a set of the seismic sources 405. It will be understood that the seismic wave that is emitted by a seismic source 405 and received by a seismic receiver 408 generates a signal varying with time, which signal consists of a part that comes from the seismic wave that passes through the complex overburden 410 towards the receiver 408 and a part that comes from waves that travel all the way down to the target area 412 and that are reflected back to the seismic receiver 408. The first part of the signal is called the direct part of the signal. The latter part of the signal contains the valuable target information. It is an object of the present disclosure to suppress the distortions in the signal caused by the seismic waves traveling through the complex overburden 410.

In the process of redatuming, the actual seismic sources are replaced by simulated seismic sources. Each of the three components (x, y, z) of a seismic traces generated from its surface source can be redatumed to a virtual source location at the borehole receiver without knowledge of the overlying velocity model:

$$d_{x(y)(z)}(g', g) = \sum_s U(g', s) D(g, s) = \sum_s \phi(s, g', g), \quad (1)$$

where s is surface source position, g is the receiver position in the borehole, and g' is the virtual source position in the borehole, U and D denote reflection waves and direct waves in VSP data, and $\phi(s, g', g)$ represents the spectral cross-correlation function between U and D. The effect of this processing is to produce a set of redatumed data in which the sources and receivers are in the borehole. In practice, the spectral cross-correlation function may be implemented by convolution with a time-reversed portion of a signal. See Calvert.

It is important to note that for the salt flank model of FIG. 3, the source must be on the same side of the salt face as is the borehole. Hence the configuration shown in FIG. 2 would not work: here, the first arrival in the receiver would have passed through the salt face and hence would not produce a reflection from the salt face.

Based upon the three component virtual source traces $d_{x(y)(z)}(g', g)$, we write the three-component vector summation of the 3D Kirchhoff prestack depth migration as:

$$M(i, j, k) = \sum_{g'}\sum_{g} W(i, j, k, g', g) \begin{bmatrix} r_x(i, j, k, g)d_x(t_{g'} + t_g) + \\ r_y(i, j, k, g)d_y(t_{g'} + t_g) + \\ r_z(i, j, k, g)d_z(t_{g'} + t_g) \end{bmatrix} \quad (2)$$

where $M(i, j, k)$ is the migration result for each image grid (i, j, k), $W(i, j, k, g', g)$ is a weighting factor which varies with the position of the image point, g' is the virtual source and g is the borehole receiver, $[r_x(i,j,k,g), r_y(i,j,k,g), r_z(i,j,k,g)]$ are the x, y, and z receiver components of a unit ray vector of reflection waves from the image point (i, j, k) to the receiver g, $t_{g'}$ is the travel time from the virtual source g' to the image point (i, j, k), $t_g$ is the travel time from the image point (i, j, k) to the receiver g, and $[d_x(t_{g'}+t_g), d_y(t_{g'}+t_g), d_z(t_{g'}+t_g)]$ are the three vector component (x, y, z) amplitudes of the receiver g at travel time $t_{g'}+t_g$. For a further discussion of vector 3-C 3-D Kirchhoff migration, see U.S. 2005/0135189 of Wang having the same assignee as the present disclosure and the contents of which are incorporated herein by reference. For the example considered, data from a single source component are used. This is not intended to be a limitation to the method, and in practice, multiple source components may be used.

Our new virtual source vector migration was tested using a synthetic dataset generated using 2D elastic finite-difference (FD) modeling. A walkaway VSP (WVSP) survey geometry was used to model data that would be generated as the seismic signal passes through a high-velocity salt lens that 305 lies between the source and receivers, and reflects from the steeply dipping portion of the salt, close to the VSP receivers. The model is presented as FIG. 3. The image target is the nearly vertical portion of the salt flank 311 inside the reservoir zone (purple layer in the model). For this type of survey, the main limitation for conventional VSP imaging would be the construction of an accurate velocity model required for migration imaging as the lateral and vertical extent of features such as a salt lens is often poorly understood from geologic and seismic data.

Figure 5:
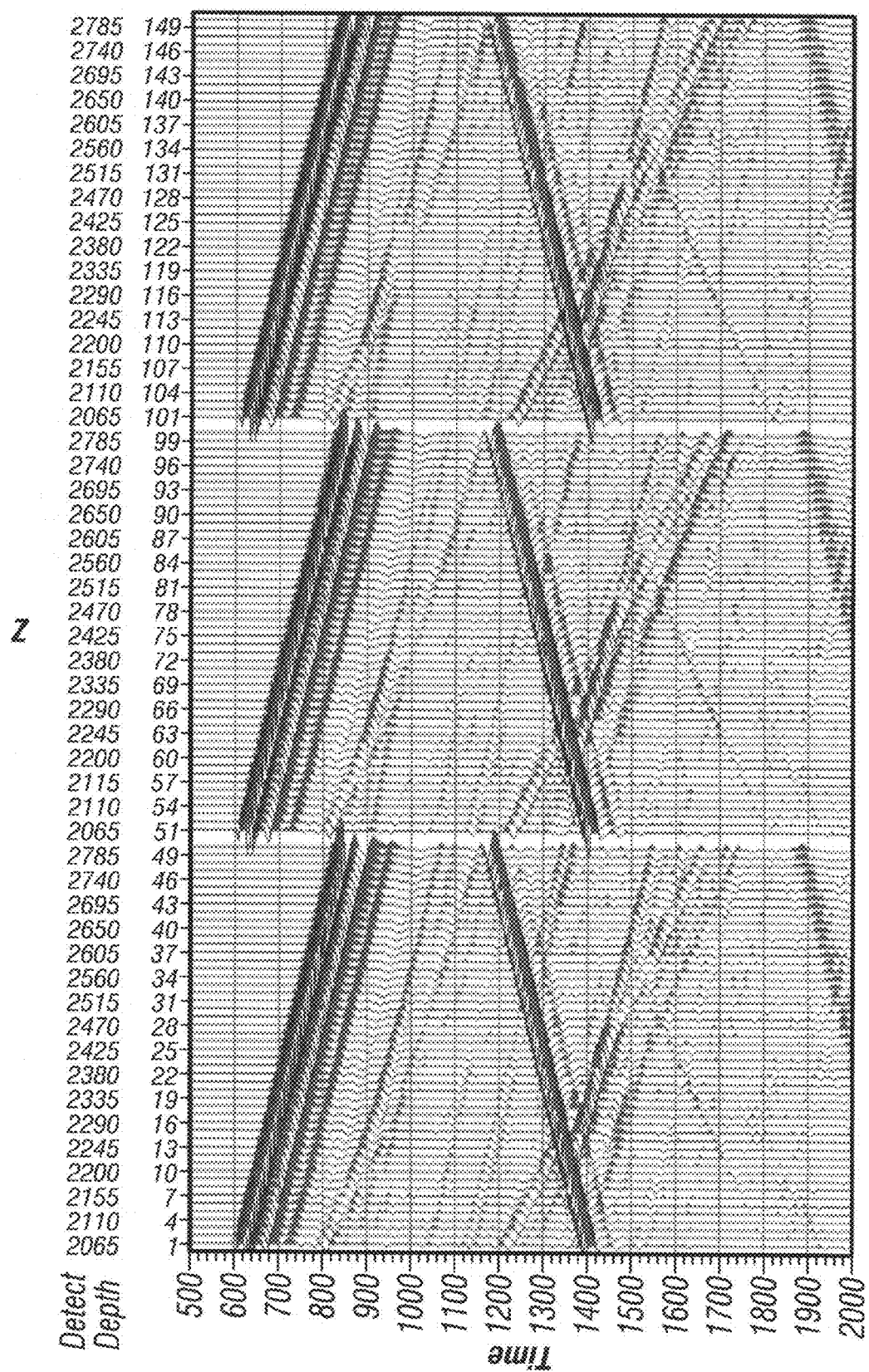
FIG. 5 shows three selected shot gathers; (vertical Z and horizontal inline X)
Figure 5:
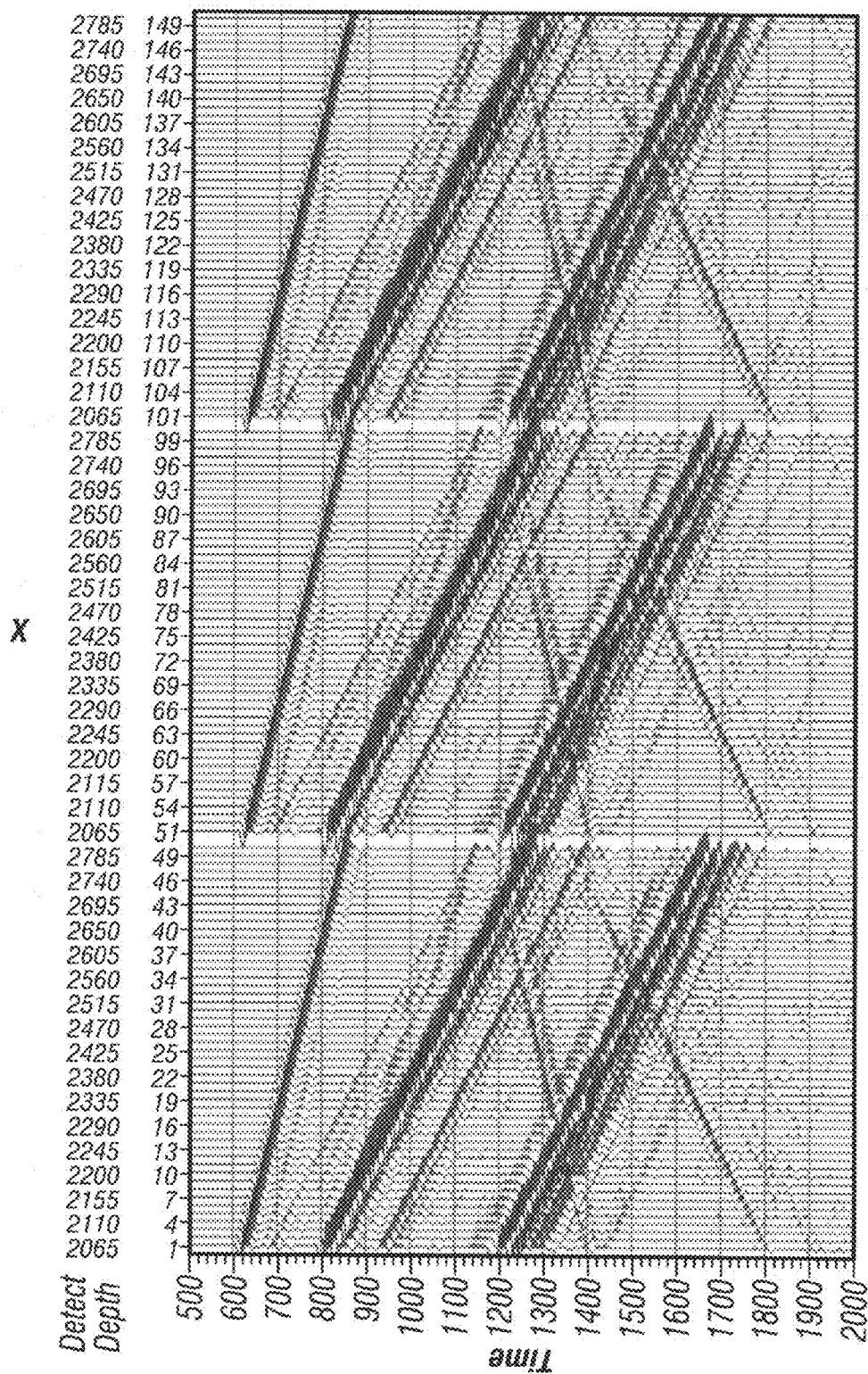

The WVSP geometry consisted of 50 surface source positions spaced 50 meters apart, between the x-coordinate locations of 4500 and 7000 m. The depth of all sources is 10 m below the free surface. A total of 50 three-component borehole receivers were modeled between the vertical depths of 2050 and 2800 m spaced at 15 m intervals. The wellhead position is at an x-coordinate of 4000 m. Three 2-component (vertical z- and horizontal inline x-) common-shot gathers are displayed in FIG. 5. The horizontal crossline component y- is not displayed since its amplitude is zero for any 2D isotropic model. The FD modeling result shows complicated wavefields consisting of distorted P and PS direct arrivals that pass through and are generated from the complex overburden, refractions from the salt flank, PP and PS reflections from sedimentary layers, and other numerical noise.

Figure 6:
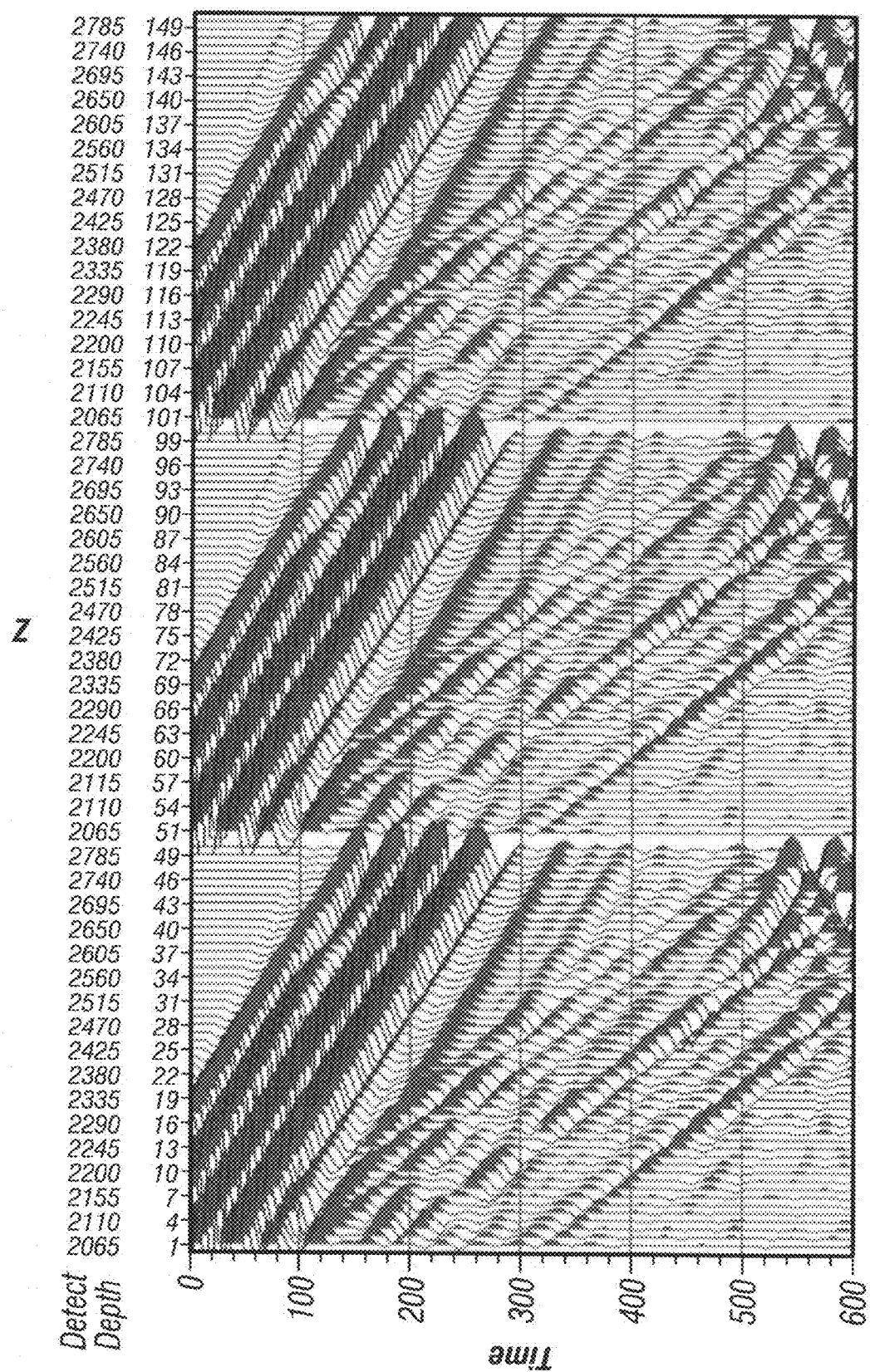
FIG. 6 shows three selected two-component (Z and X) virtual source VSP shot gathers in which the surface sources have been redatumed to the receiver positions in the borehole by seismic interferometry.
Figure 6:
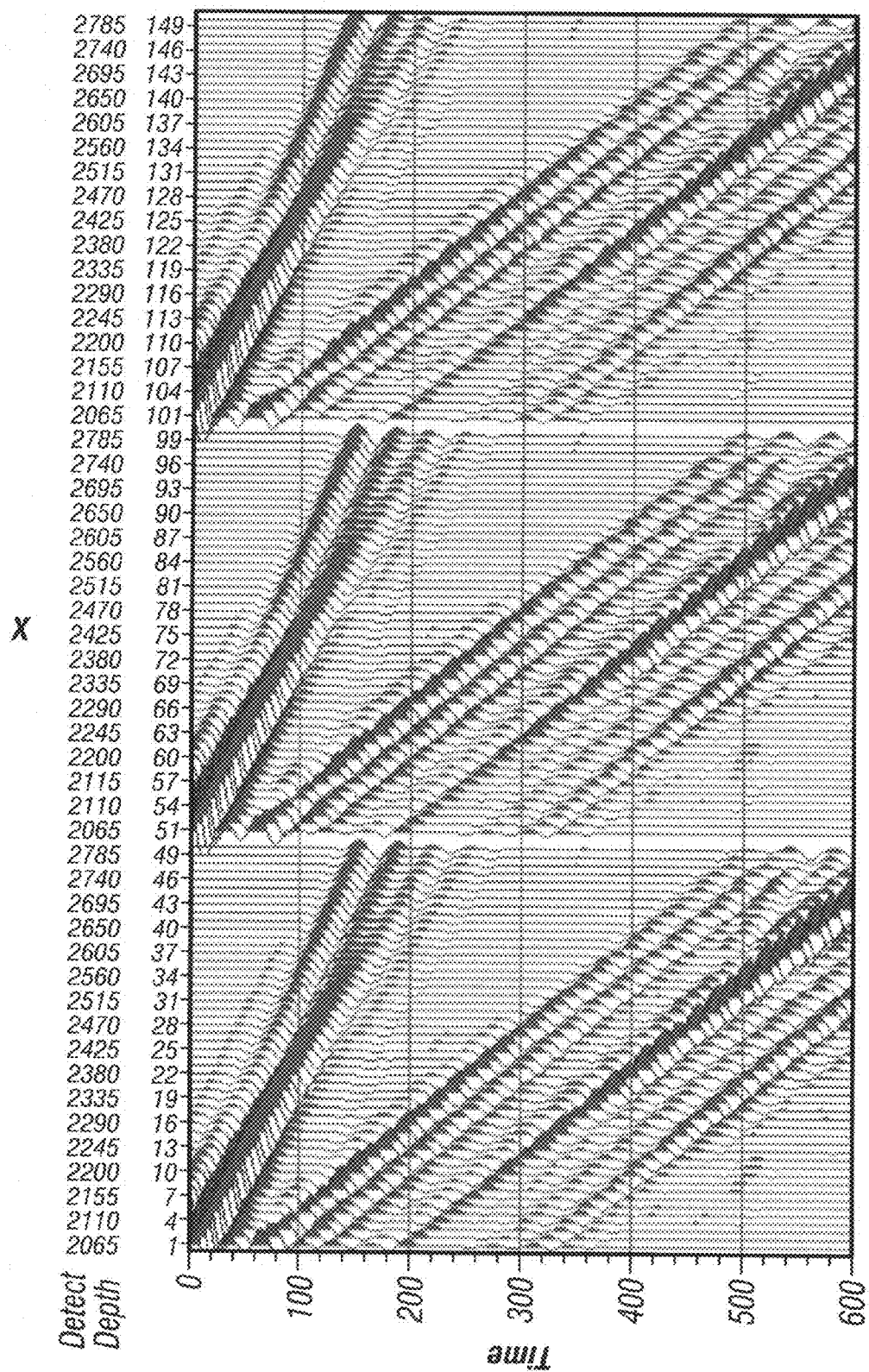
Figure 7A:
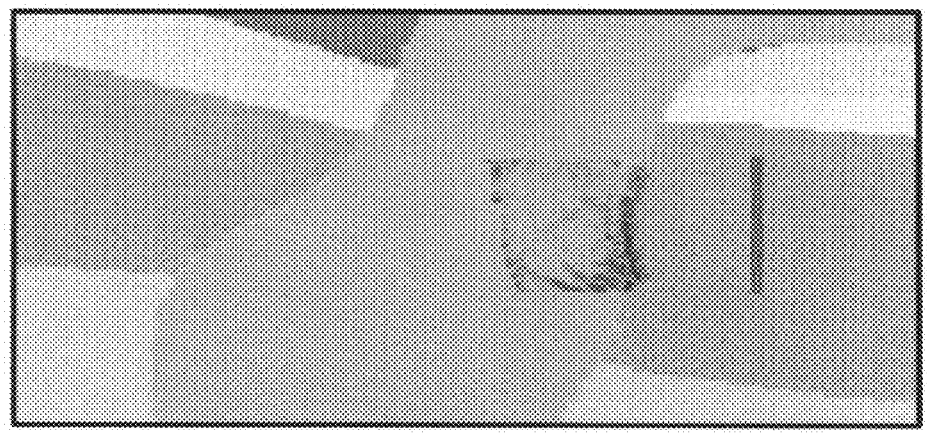
FIGS. 7A-7C shows salt flank imaging results of the virtual source VSP data and their overlays on the salt flank velocity model: (a) The vector migration of both vertical Z and inline horizontal X components; (b) migration of the vertical Z component alone, and (c) migration of the inline horizontal X component alone.

Using our new virtual source vector migration method, each of the two components (z- and x-) shot gathers were redatumed to the 50 receivers positions in the borehole through seismic interferometry. FIG. 6 shows the z- and x-components for the virtual source gathers generated at the three shallowest receiver positions in the borehole. A simple layered velocity model was constructed using the sedimentary layer velocities between the salt flank and the borehole receivers. Vector Kirchhoff migration was applied to a selected time window between 350-500 milliseconds, where the reflection from the salt flank was identified in the dataset. The vector migration result is overlain on the original known salt flank model and is shown in FIG. 7A. A large section of the salt flank inside the reservoir zone has been correctly imaged. It is expected that if more VSP receivers were put into the borehole, then the larger section of the slat flank could be imaged from the virtual source VSP data.

Figure 7B:
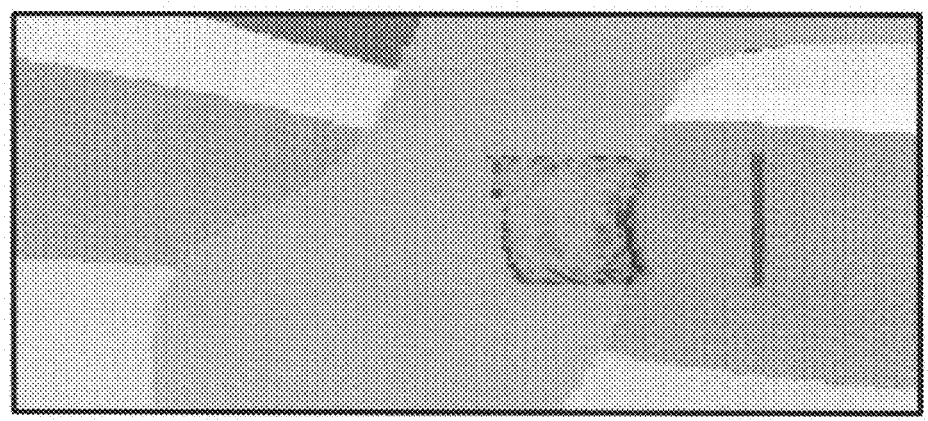
Figure 7C:
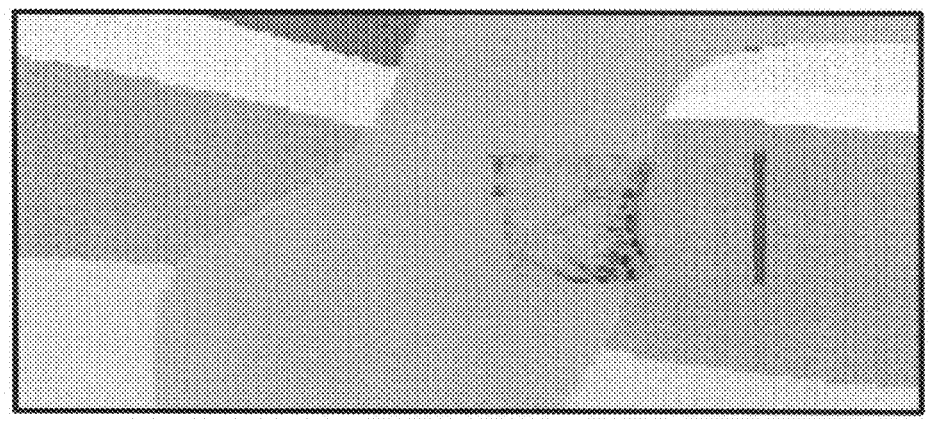

For comparison with the vector migration result, conventional single component virtual source migration results for the z- and x-components are shown in FIGS. 7B and 7C respectively. A constant fixed amplitude display scale is used in FIGS. 7A-C to enable an amplitude comparison between the images. FIGS. 7A-C clearly demonstrate that the amplitude strength and imaging quality is significantly enhanced by the vector migration of the x- and z-components referenced to the single component scalar migrations of z- or x-components. Note that the amplitude of the imaged salt flank is the strongest in FIG. 7A of FIGS. 7A-C.

The results of the processing, such as an image of the subsurface, may be stored on a medium such as a computer memory. The results of the processing may be used for additional reservoir development operations, such as drilling of additional wells, determining a pattern for the additional wells, and conduction of additional seismic operations to provide a better image of the salt body. It should be further noted that the use of the method described above is not limited to complexities caused by salt bodies, and the method may also be particularly useful in reservoir development to resolve complexities caused by shale diapirs, by igneous formations intrusives and extrusives, and by faulting. It should also be noted that the method is not limited to regions of such complexity and may be used even in simple geometries and velocities.

The inversion and migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above. Inherent in the imaging process is recording the image on a suitable medium.

While the foregoing disclosure is directed to the preferred embodiments of the disclosure, various modifications will be apparent to those skilled in the art. It is intended that all such variations within the scope and spirit of the appended claims be embraced by the foregoing disclosure.

What is claimed is:

1. A method of seismic imaging a subsurface formation comprising:

receiving, at a plurality of receiver locations in a borehole, signals responsive to seismic energy generated at a plurality of source locations, the signals including multicomponent seismic data;

redatuming the received signals to provide a redatumed data set simulating virtual source positions in the borehole; and performing a vector Kirchhoff migration of a reflection in the redatumed data set to provide an image of the subsurface.

2. The method of claim 1 wherein the earth formation further comprises a complex medium between the receiver locations and the source locations.

3. The method of claim 1 further selecting, for the source locations, locations in the near-surface of the earth.

4. The method of claim 2 wherein the complex medium is selected from: (i) a salt overhang. (ii) a shale diaper, (iii) an intrusive, (iv) an extrusive, and (v) a faulted zone.

5. The method of claim 1 wherein providing an image of the subsurface further comprises providing an image of a flank of a salt dome.

6. The method of claim 1 wherein the redatuming further comprises an operation selected from: (i) a spectral cross-correlation, and (ii) a convolution with a time-reversed trace.

7. The method of claim 5 wherein performing the vector Kirchhoff migration further comprises using a simple velocity model for a sedimentary column between the borehole and the flank of the salt dome.

8. A system for seismic imaging a subsurface formation, the system comprising:
    at least one seismic source configured to generate seismic waves into the earth from a plurality of locations;
    at least one multicomponent receiver configured to receive multicomponent seismic data in a borehole at a plurality of receiver locations; and
    at least one processor configured to:
        (i) redatum the receiver multicomponent seismic data to a redatumed data set simulating virtual source positions in the borehole, and
        (ii) perform a vector Kirchoff migration of a reflection in the redatumed data set to provide an image of the subsurface.

9. The system of claim 8 wherein the subsurface formation includes a complex medium between the source locations and the plurality of receiver locations.

10. The system of claim 8 wherein the complex medium further is selected from: (i) a salt overhang. (ii) a shale diaper, (iii) an intrusive, (iv) an extrusive, and (v) a faulted zone.

11. The system of claim 8 wherein the image of the subsurface provided by the at least one processor further comprises a salt dome.

12. The system of claim 8 wherein the at least one processor is further configured to perform the redatuming by an operation selected from: (i) a spectral cross-correlation, and (ii) a convolution with a time-reversed trace.

13. The system of claim 8 wherein the at least one processor is further configured to perform the migration by using a simple velocity model for a sedimentary column between the borehole and a flank of a salt dome.

14. A non-transitory computer-readable medium product having stored thereon instructions that when read by at least one processor cause the at least one processor to perform a method, the method comprising:
    redatuming multicomponent seismic data to virtual source positions in a borehole, the seismic data being received by at least one receiver responsive to activation of a seismic source at a plurality of depths in the borehole; and
    performing a vector Kirchhoff migration of the redatumed data to provide an image of the subsurface.

15. The non-transitory computer-readable medium product of claim 14 further comprising at least one of: (i) a ROM, (ii) an EPROM, (iii) an EAROM, (iv) a flash memory, and (v) an optical disk.

* * * * *